United States Patent [19]

Kenji et al.

[11] Patent Number: 4,708,477
[45] Date of Patent: Nov. 24, 1987

[54] PHOTOMETER

[75] Inventors: Yabusaki Kenji, Kashiwa; Tozawa Hitoshi; Noda Akira, both of Tokyo; Ito Takashi, Ohmiya, all of Japan

[73] Assignee: Tokyo Kogaku Kikai Kabushiki Kaisha, Tokyo, Japan

[21] Appl. No.: 829,273

[22] Filed: Feb. 13, 1986

[30] Foreign Application Priority Data

Feb. 19, 1985 [JP] Japan .................. 60-30814

[51] Int. Cl.$^4$ .............................. G01J 1/42
[52] U.S. Cl. .................... 356/222; 356/230
[58] Field of Search ........... 356/222, 230, 217, 219, 356/300, 233, 224

[56] References Cited

U.S. PATENT DOCUMENTS

| 323,431 | 6/1867 | Card | 356/230 |
| 2,400,096 | 5/1946 | Bradley | 356/230 |
| 3,502,890 | 3/1970 | Hedelman | 356/230 |
| 3,519,361 | 7/1970 | Hidaka et al. | 356/222 |
| 3,973,266 | 8/1976 | Kakunodate et al. | 356/222 |

Primary Examiner—R. A. Rosenberger
Assistant Examiner—Crystal D. Cooper
Attorney, Agent, or Firm—Brumbaugh, Graves, Donohue & Raymond

[57] ABSTRACT

A photometrical apparatus has a first light receiving element, and a second light receiving element less sensitive to temperature and other environmental influences than said first light receiving element whereby a value Pm of measured quantity of light from the subject is calculated from the following formula $$Pm = Pr \times \frac{Dpo\ Dst}{Dpt\ Dso} \times \frac{Dm}{Dr}$$

Pr designates a quantity of light from a standard light source, Dr and Dm designate outputs of the first light receiving element generated by the light from the standard light source and the subject, Dpo and Dpt designate outputs of the first light receiving element generated by the light from the reference light source and the subject, and Dso and Dst designate outputs of the second light receiving element generated by the light from the reference light source and the subject.

12 Claims, 8 Drawing Figures

PHOTOMETER

BACKGROUND OF THE INVENTION

1. Field of the Invention

The present invention relates to a photometer, and more particularly to a photometer improved by compensating for characteristic variations of a light receiving element due mainly to such environmental changes as temperature change.

2. Description of Prior Art

The conventional photometer uses a photomultiplier as a light receiving element, especially for the measurement of an extremely small quantity of light.

A photomultiplier is highly sensitive, but its characteristic variation is so large under the influence of temperature changes, etc. as to sometimes affect the measurement results. For this reason, in a photometer using a photomultiplier a standard light source is used for correction immediately before the purpose light is measured, thus eliminating or reducing the influence of characteristic variations on the measured light value.

It is cumbersome, in the above conventional photometer to carry out the correction step before the measurement as well as to provide the standard light source for correction as a means of eliminating or reducing the influence of environmental changes an the photomultiplier.

The standard light source generally consists of a gas-filled tungsten lamp, and it is difficult to maintain the high degree of measurement accuracy over a long term by using such a lamp which will inevitably deteriorate with the passage of time.

OBJECT OF THE INVENTION

The present invention has been provided in full consideration of these problems of the conventional method. It is an object of this invention to provide a photometer which can perform light measurement at high accuracy over a long term without being affected by the characteristic variations experienced by a light receiving element which are caused by environmental changes.

SUMMARY OF THE INVENTION

According to the present invention, the above and other objects can be accomplished by a photometer comprising a first light receiving portion;

a second light receiving portion more stable in sensitivity characteristics than said first light receiving portion;

an optical portion including a reference light source and adapted for introducing light from a subject into said first light receiving portion and for introducing light from said reference light source into said first and second light receiving portions on the basis of a control signal from a controller portion;

said controller portion for feeding a first control signal by which said light from said subject is introduced into said first light receiving portion in accordance with a command from the measurer, and a second control signal by which said light from said reference light source is introduced into said first and second light receiving portions;

a memory portion for memorizing a photometric quantity Pr from a standard light source for setting the scale, an output Dr of said first light receiving portion generated by said light from said standard light source, an output Dpo of said first light receiving portion generated by said light from said reference light source during the scale setting time, and an output Dso of said second light receiving portion generated by said light from said reference light source during the scale setting time;

an operation portion supplied with an output Dm of said first light receiving portion generated by said light from said subject, an output Dpt of said first light receiving portion generated by said light from said reference light source during the measuring time, an output Dst of said second light receiving portion generated by said light from said reference light source during the measuring time, and said outputs Dr, Dpo and Dso read from said memory portion, said operation portion calculating a value Pm of photometric quantity said subject by the operation:

$$Pm = Pr \times \frac{Dpo \cdot Dst}{Dpt \cdot Dso} \times \frac{Dm}{Dr}$$

According to a specific aspect of the present invention, there is provided an photometer in which said memory portion memorizes a photometric quantity Pr said standard light source for scale setting before the scale is set and memorizes, during the scale setting time, said output Dr of said first light receiving portion generated by said light from said standard light source, said output Dpo of said first light receiving portion and said output Dso of said second light receiving portion generated by said light from said reference light source.

In one aspect of the present invention, there is provided an photometer in which said optical portion turns on said reference light source in accordance with said second control signal from said control portion and forms a first light path through which said light from said subject is introduced into said first light receiving portion in accordance with said first control signal, and second and third light paths, said light from said reference light source being introduced through said second light path into said first light receiving portion and through said third light path into said second light receiving portion in accordance with said second control signal.

In another aspect of the present invention, there is provided an photometer in which said optical portion includes a spectroscope in said first optical path.

According to the present invention, said optical portion permits the quantity of light from said reference light source to be introduced into said second light receiving portion at the higher rate than the quantity of light introduced from said reference light source to said first light receiving source, and said operation portion identifies each of said outputs Dm, Dpt and Dst on the basis of a signal from said control portion.

DESCRIPTION OF THE PREFERRED EMBODIMENTS

(Principle of the Invention)

Figure 1:
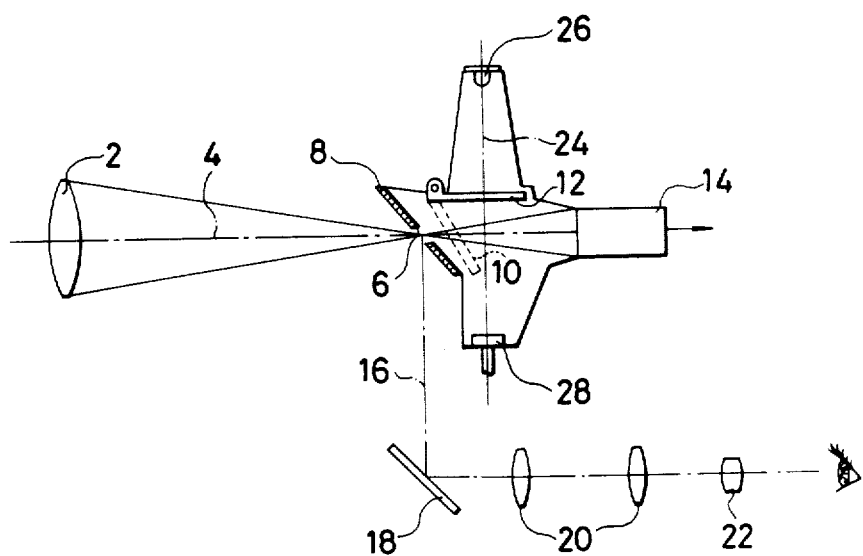
FIG. 1 is an optical chart of a photometer comprising the first embodiment of the present invention.

According to the arrangement of the present invention, the memory portion first memorizes the photometric quantity Pr of the standard light source in the scale setting time. When the photometer aims to measure luminance, the photometric quantity Pr is considered to be the value of luminance, and when illuminance is to be measured, the photometric quantity Pr is considered to be the value of illuminance. Thus, it is determined in accordance with the object of measurement. Secondly, the reference light source is turned on, and the optical portion is so controlled by the controller portion as to introduce a beam from the reference light source into the first and second light receiving portions. The outputs Dpo and Dso of the first and second light receiving portions thereby generated are stored in the memory portion.

Then, the reference light source is turned off, and the standard light source is turned on. The optical portion is so controlled by the controller portion as to introduce a beam from the standard light source into the first light receiving portion. The output Dr of the first light receiving portion thereby obtained is memorized.

When the light measurement step is carried out, the reference light source is turned on, and the optical portion is so controlled as to introduce a beam from the reference light source into the first and second light receiving portions. The outputs Dpt and Dst thereby obtained are supplied to the operation portion. Then, the reference light source is turned off, and the optical portion is so controlled as to introduce a beam from the subject into the first light receiving portion. The output Dm of the first light receiving portion thereby obtained is supplied to the operation portion.

The operation portion reads the outputs Dpo and Dso of the first and second light receiving portions generated by the beam from the reference light source and stored in the memory portion, the photometric quantity Pr of the standard light source, and the output Dr of the first light receiving portion generated by the light emitted from the standard light source.

The above outputs Dr, Dm, Dpo, Dpt, Dso and Dst are represented by the equations shown as follows.

$$Dr = Pr \times K_1 \qquad (1)$$

$$Dm = Pm \times K_1 \times (1+\alpha) \qquad (2)$$

$$Dpo = P_{LED} \times K_2 \qquad (3)$$

$$Dpt = P'_{LED} \times K_2 \times (1+\alpha) \qquad (4)$$

$$Dso = P_{LED} \times K_3 \qquad (5)$$

$$Dst = P'_{LED} \times K_3 \qquad (6)$$

where $P_{LED}$: photometric quantity by LED in scale setting time $P'_{LED}$: photometric quantity by LED in light measuring time $K_1, K_2, K_3$: Constants of proportion in accordance with optical and electrical systems proper to the apparatus $\alpha$: Coefficient of drift From the formulas (1) and (2), a photometric quantity Pm of the subject is:

$$Pm = Pr \times \frac{Dm}{Dr} \times \frac{1}{(1+\alpha)} \qquad (7)$$

From the formulas (3) and (4), $$\frac{1}{(1+\alpha)} = \frac{Dpo}{Dpt} \cdot \frac{Dst}{Dso} \qquad (8)$$

When the formula (8) is inserted in the formula (7), the photometric quantity Pm of the subject is:

$$Pm = Pr \times \frac{Dm}{Dr} \times \frac{Dpo \cdot Dst}{Dpt \cdot Dso} \qquad (9)$$

The operation portion carries out the operation by the formula (9) on the basis of the input data. Thus, the photometric quantity of the subject is obtained without being affected by the coefficient of drift $\alpha$.

(First Embodiment)

A photometer which comprises the embodiment of the present invention has, as shown in FIG. 1, an objective lens 2 opposing the object, an apertured mirror 8 located on the optical axis 4 of the objective 2 and obliquely mounted with its aperture 6 positioned at the rear focal point of the objective 2, a movable mirror 12 located at the rear of the apertured mirror 8 and swingable between the inserted position 10 in which it is inserted in the midway of the optical axis 4 so as to interrupt the same and the retracted position indicated by a solid line, and a photomultiplier 14 located on the optical axis 4 at the rear of the movable mirror 12 and adapted as a first light receiving portion. The photometer also has a mirror 18 on the optical axis of reflection from the apertured mirror 8, a pair of relay lenses 20 and an ocular 22.

The photometer is further provided with a LED 26 as a reference light source and a silicon photodiode 28 (hereinafter referred to as an SPD) as a second light receiving portion located on an optical axis 24 and opposing each other with the optical axis 4 interposed therebetween. The optical axis 24 meets the optical axis 4 at right angles at the place between the apertured mirror and the photomultiplier 14 and passes parpendicularly through the movable mirror 12 in the retracted position. The movable mirror is so located that its reflective surface does not cross the optical axis 24 when set at the inserted position 10 on the optical axis 4. Accordingly, most of the quantity of light emitted from the LED 26 reaches the SPD 28, and the remaining slight amount of light reflects on the movable mirror 12 and reaches the photomultiplier 14. This is designed in consideration of the difference between sensitivities of the light receiving portions.

Figure 2:
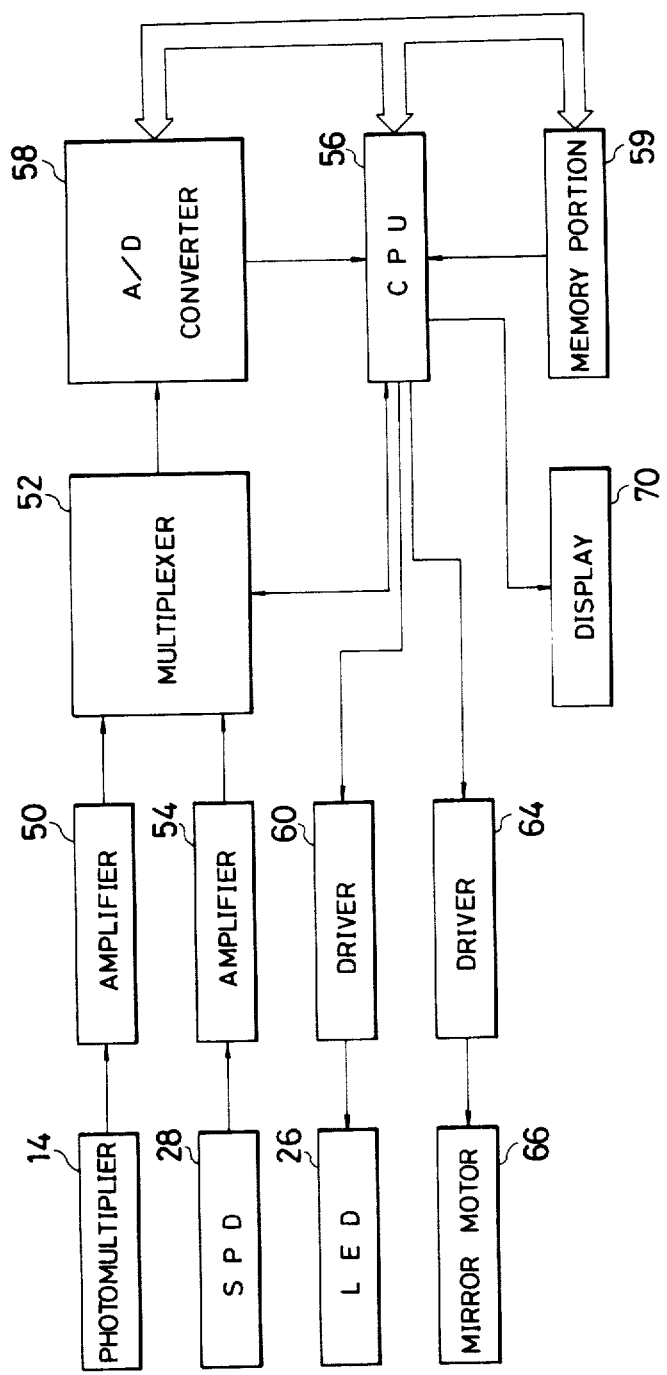
FIG. 2 is a block diagram of a control system of the first embodiment photometer.

In the control system in the photometer comprising the first embodiment, the output of the photomultiplier 14 is amplified by an amplifier 50 and supplied to a multiplexer 52, as shown in FIG. 2. Similarly, the output of the SPD 28 is amplified by an amplifier 54 and supplied to the multiplexer 52. The outputs of the photomultiplier 14 and the SPD 28 are supplied through the multiplexer 52 to an A/D converter 58 under the control of a CPU 56. The A/D converter 58 converts the input signals into digital signals and supplies them to a memory 59.

The CPU 56 lights the LED 26 by the medium of a driver 60 and rotates a mirror motor 66 by the medium of a driver 64 so as to swing the movable mirror 12, in the manner of the working state described below. On the other hand, the CPU 56 receives the outputs of the photomultiplier 14 and the SPD 28 generated during the scale setting time and stored in the memory portion 59 and the outputs of the photomultiplier 14 and the SPD 28 generated during the light measuring time and stored in the memory portion 59, and calculates by the formula (4) so as to obtain the photometric quantity Pm of the subject and indicate this by an indicator 70.

Figure 3A:
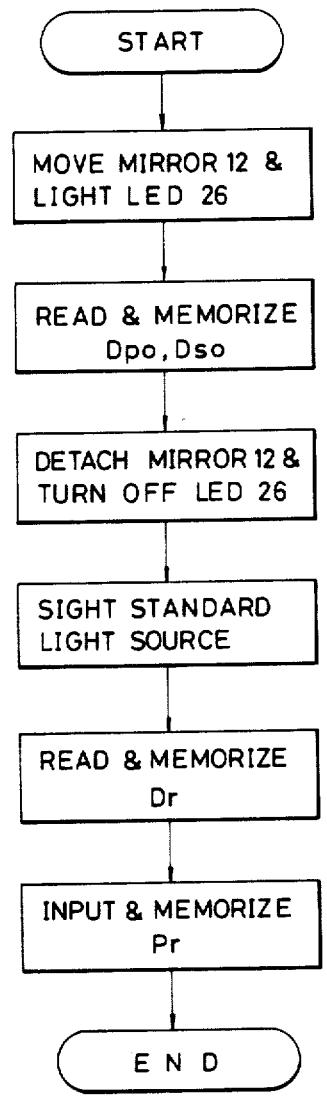
FIGS. 3A and 3B are flowcharts showing the working state of the first embodiment photometer.
Figure 3B:
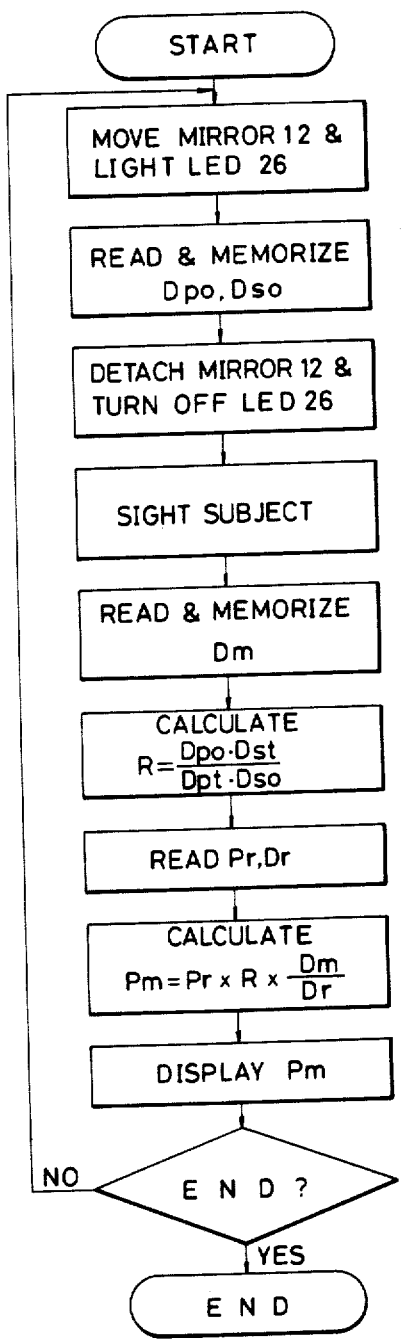

In the working state of the photometer comprising the first embodiment during the scale setting time, the movable mirror 12 is, in the first place, moved to the position indicated by the dotted line 10 in FIG. 1 on the optical axis 4, and the LED 26 is turned on, as shown in FIG. 3A. Then, the outputs Dpo and Dso of the photomultiplier 14 and the SPD 28 generated by light emitted from the LED 26 are read and memorized in the memory portion 59.

Next, the movable mirror 12 is detached from the optical axis 4 and moved to the position indicated by the solid line in FIG. 1, and the LED 26 is turned off. Then, when the standard light source is turned on and sighted, the output Dr of the photomultiplier is read and memorized in the memory portion 59. Further, the photometric quantity Pr (theoretical value) of the standard light source is supplied to and memorized by the memory portion 59.

On the other hand, in the working state of the photometer during the light measuring time, as shown in FIG. 3A, the movable mirror 12 is, in the first place, moved to the position indicated by the dotted line 10 in FIG. 1 on the optical axis 4, and the LED 26 is turned on. Then, the outputs Dpo and Dso of the photomultiplier 14 and the SPD 28 generated by light emitted from the LED 26 are read and memorized in the memory portion 59.

Next, the movable mirror 12 is detached from the optical axis 4 and moved to the position indicated by the solid line in FIG. 1, and the LED 26 is turned off. Then, when the subject is sighted, the output Dm of the photomultiplier 14 is read and memorized in the memory portion 59. Successively, Dpo, Dst, Dpt and Dso is read from the memory portion 59, and the drift correction value $R=(Dpo \cdot Dst)/(Dpt \cdot Dso)$ is calculated. Pr and Dr is read from the memory portion 59, and $Pm=Pr \times R \times (Dm/Dr)$ is calculated and indicated. Then, whether or not the measurement is completed or not is decided. If it is judged to be uncompleted, the process is returned to the initial measurement step. If it is judged to be completed, the process comes to an end.

(Second Embodiment)

Figure 4:
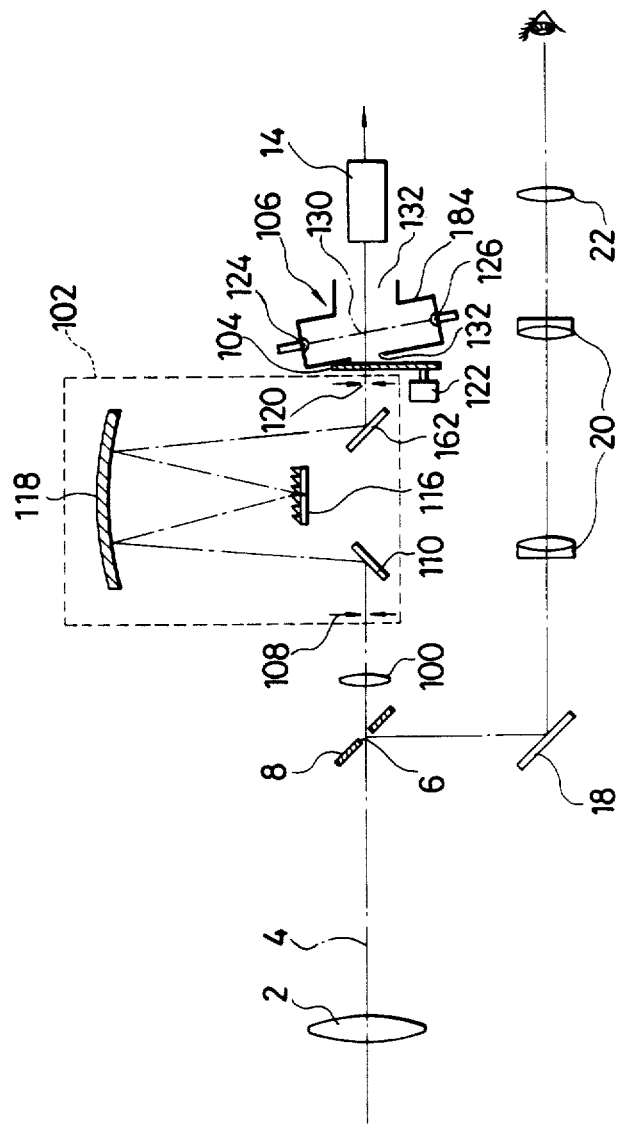
FIG. 4 is an optical chart of a photometer comprising the second embodiment of the present invention.

The photometer shown in FIG. 4 is the second embodiment of the present invention. Common constituents of the first and second embodiments are given the same reference numerals and repetitious explanation will be omitted. In the photometer comprising the second embodiment of the present invention, a relay lens 100, monochromator 102, shutter 104 and a reference light optical portion 106 are provided between an apertured mirror 8 and a photomultiplier 14 on the optical axis 4. The relay lens 100 provides a conjugate relationship between an aperture 6 of apertured mirror 8 and an inlet slit 108 of the monochromator 102. The monochromator 102 has the inlet slit 108, a mirror 110 for reflecting the optical axis 4 introduced through the inlet slit 108, a plane diffraction grating mirror 116 rotated by a diffraction grating motor (not shown), a concave mirror 118 having a focal point at the inlet slit 108 and adapted for reflecting the optical axis 4 before and after the reflection on the plane diffraction grating mirror 116, and an outlet slit 120. A beam of parallel light reflecting on the concave mirror is led to the plane diffraction grating mirror 116. Then, the beam is led to the shutter 104 through the mirror 162. The shutter 104 is opened and closed by a shutter motor 122, the beam proceeding along the optical axis 4 and thereby being permitted to pass or being obstructed.

The reference light optical portion 106 is constituted by an LED 124 and SPD 126 which face each other and are positioned on the opposite sides of the optical axis 4. The optical axis 130 connecting the LED 124 and the SPD 126 does not meet the optical axis 4 at right angles, and the LED 124 and the SPD 126 are so positioned that the SPD 126 is nearer to the photomultiplier 14 than the LED 124. The reference light optical portion 106 also has a cylindrical housing 184 whose axis corresponds to the optical axis 130, and a pass hole 132 in the side of its cylindrical portion through which the beam proceeds along the optical axis 4. When the LED 124 is turned on, most of the quantity of light emitted from the LED 124 is led to the SPD 126, and the remaining slight quantity of light is reflected in the housing 84 and reaches the photomultiplier 14.

Figure 5:
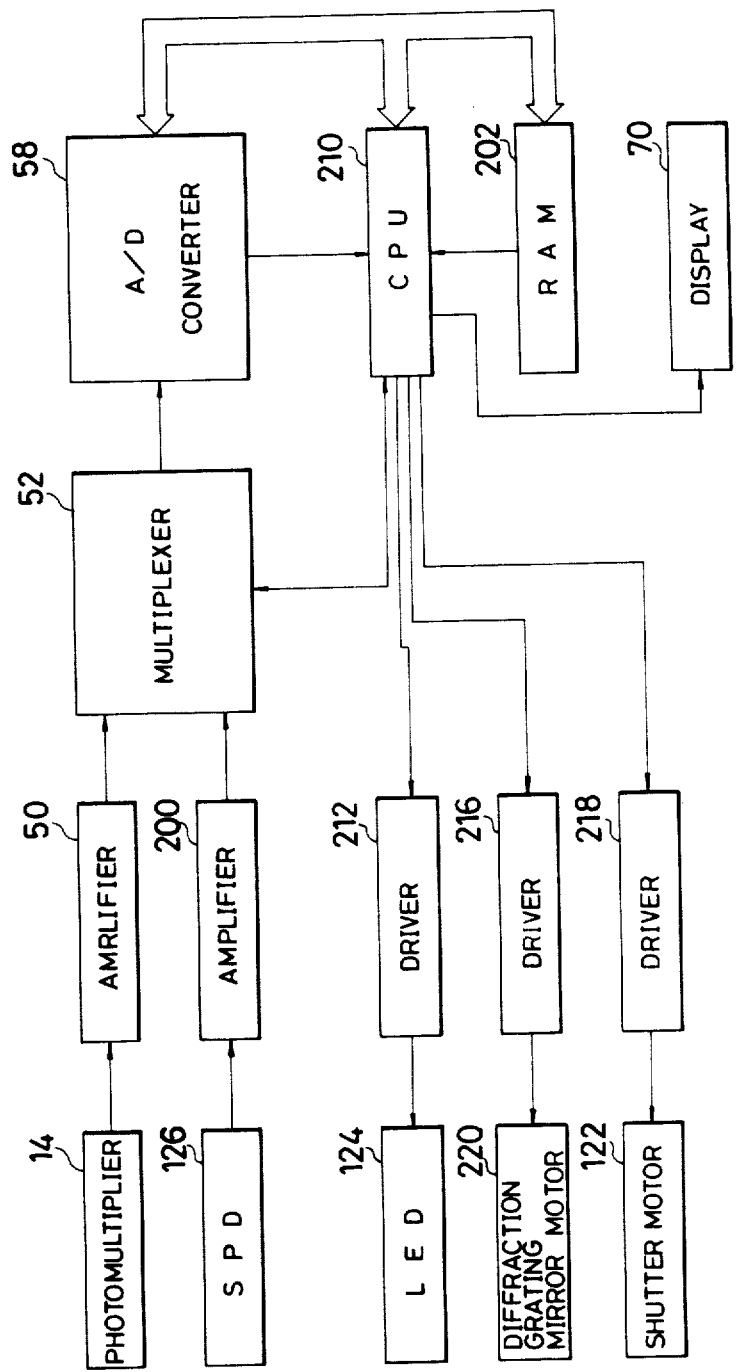
FIG. 5 is a block diagram of a control system of the second embodiment photometer.

In a controller portion of the photomultiplier which comprises the second embodiment of the present invention, the output of the photomultiplier 14 is amplified by an amplifier 50 and supplied to a multiplexer 52, as shown in FIG. 5. Similarly, the output of the SPD 126 is amplified by an amplifier 200 and supplied to the multiplexer 52. The multiplexer 52 supplies the outputs of the photomultiplier 14 and the SPD 126 to the A/D converter 58 under the control of a CPU 210. The A/D converter 58 converts the input signal into a digital signal and supplies this signal to a RAM 202.

The CPU 210 lights an LED 124 by the medium of a driver 212 and rotates a diffraction grating mirror motor 220 by the medium of a driver 216, in the manner described below. Only that kind of light reflecting in a particular direction on the diffraction grating mirror 116, namely, one having a particular wave length, is permitted by the outlet slit to pass therethrough. The way in which only a particular kind of light having a prescribed wave length is permitted to reach the photomultiplier 14 is that the angle of rotation of the diffraction grating mirror 116 is changed by rotational movement of the diffraction grating mirror motor which is moved by the driver 216.

The CPU 210 rotates a shutter motor 122 by the medium of a driver 218 so as to open and close the shutter 104, light emerging from the monochromator 102 and thereby being permitted to pass or being obstructed. The CPU 210 receives the outputs of the photomultiplier 14 and the SPD 126 generated during the scale setting time and stored in the RAM 202, and the outputs of the photomultiplier 14 and the SPD 126 relating to light of a particular wave length and generated during the light measuring time and stored in the RAM 202. Then, the photometric quantity Pm of the subject is calculated by the formula (4) and indicated by an indicator 70.

In the working state of the photometer during the scale setting time, the shutter 104 is closed and the LED 124 is turned on in the first place. Then, the outputs Dpo and Dso of the photomultiplier 14 and the SPD 126 generated by a beam emitted from the LED 126 are detected and memorized in the RAM 202.

Next, the shutter 104 is opened, and the LED 124 is turned off. Then, a standard light source is turned on and sighted, and the diffraction grating mirror 116 is rotated and moved by rotational movement of the diffraction grating mirror motor 220 to the prescribed position (corresponding to a wave length $\lambda$). The output Dr ($\lambda$), corresponding to an output of photomultiplier 14 with respect to a light beam of wavelength $\lambda$, thereby generated is detected and memorized in the RAM 202.

Successively, whether the measurement step of light of the prescribed wave length is completed or not is decided. If the step is not completed, the process proceeds to the step of driving the diffraction grating mirror motor 220. This motor 220 is rotated at a given angle, and the output Dr ($\lambda'$) of the photomultiplier 14, corresponding to a light beam of wavelength $\lambda^1$; is detected with respect to another prescribed wave length and is memorized in the RAM 202. If the measurement of light is completed with respect to all variations of the prescribed wave length, the photometric quantity (theoretical value) Pr ($\lambda$) from the standard light source measured at each wave length is supplied to and memorized in the RAM 202.

Figure 6A:
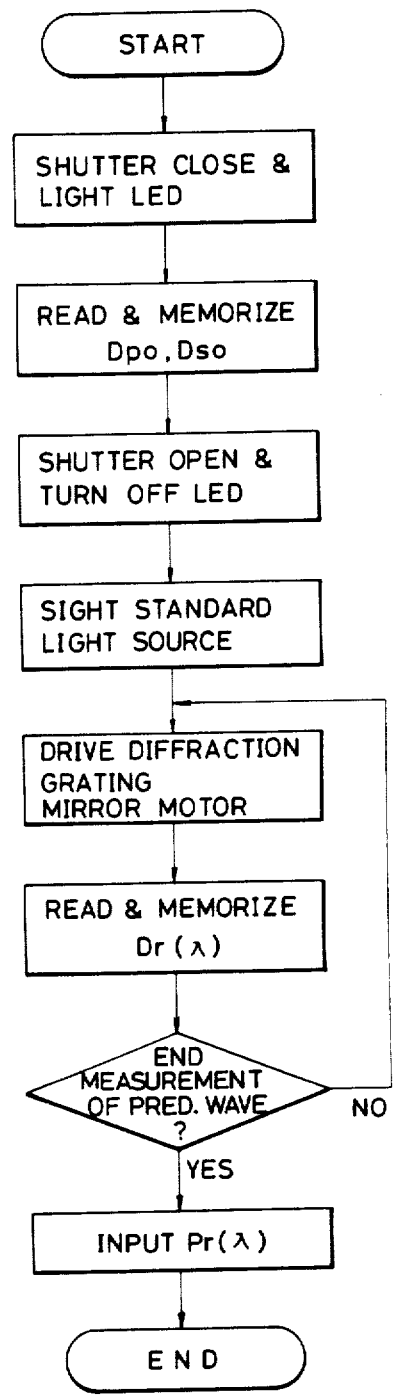
FIGS. 6A and 6B are flowcharts showing the working state of the second embodiment photometer.
Figure 6B:
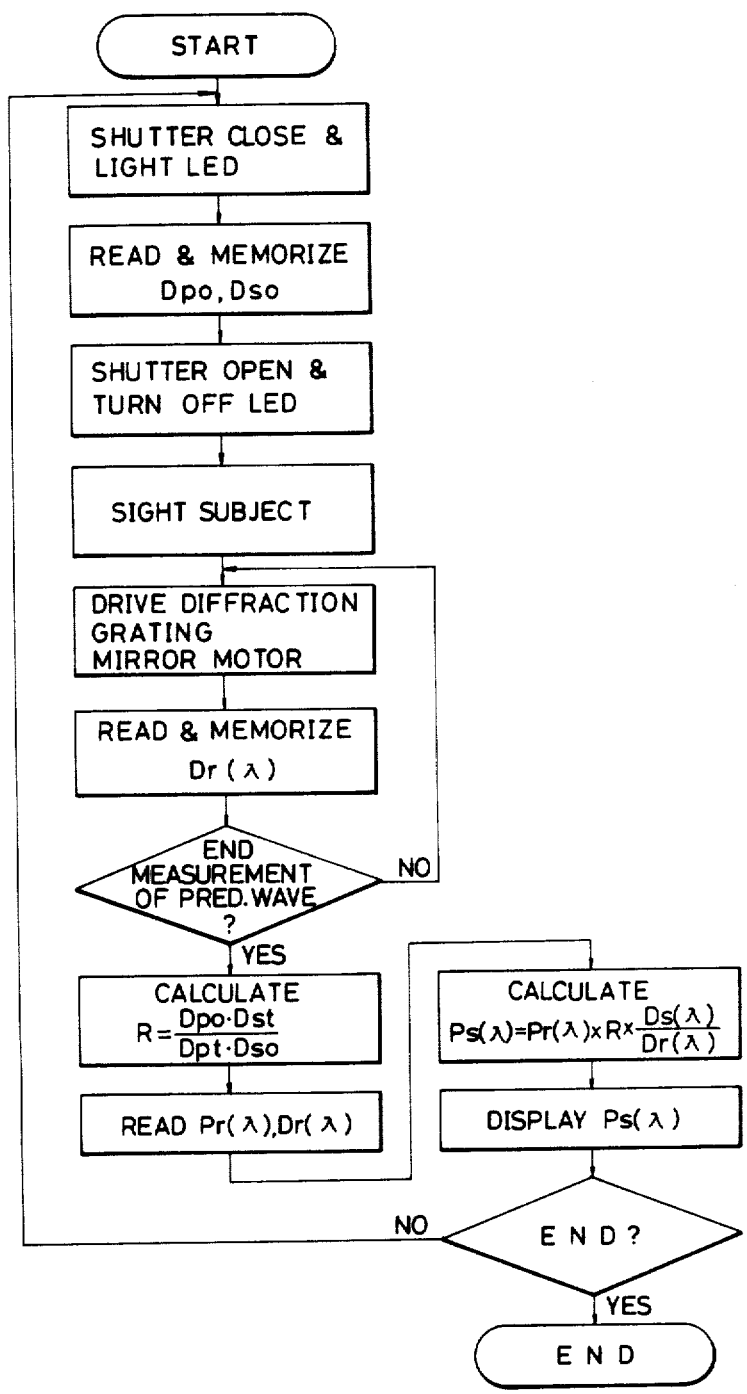

In the measuring of light, the shutter 104 is opened and the LED 124 is turned on in the first place, as shown in FIG. 6B. Then, the outputs Dpo and Dso of the photomultiplier 14 and the SPD 126 are detected and memorized in the RAM 202.

Next, the shutter 104 is opened, and the LED 124 is turned off. The subject is sighted, the diffraction grating mirror 116 is positioned at a given angle of inclination by driving the diffraction mirror motor 220 so that light of a prescribed wave length reaches the photomultiplier 14. The output Ds ($\lambda$) of the photomultiplier 14 thereby generated is detected and memorized in the RAM 202.

Successively, whether the measurement step of light of the prescribed wave length is completed or not is decided. If the step is not completed, the process proceeds to the step of driving the diffraction grating mirror motor 220. This motor 220 is rotated at a given angle, and the output Dr ($\lambda'$) of the photomuliplier 14 is detected with respect to another prescribed wave length and is memorized in the RAM 202

If the measurement for the prescribed wave length is completed, Dso, Dst, Dpt and Dso is read from the RAM 202, and the drift correction value R=(Dpo·Dst)/(Dpt·Dso) is calculated. Pr ($\lambda$) and Dr ($\lambda$) is read from the RAM at each wave length, and Ps ($\lambda$)=Pr ($\lambda$)×R×{Ds ($\lambda$)/Dr ($\lambda$)} is calculated and indicated.

Successively, whether the all steps of the measurement has been completed or not is decided. If it is judged to be uncompleted, the process is returned to the first step of measurement. If it is judged to be completed, the process comes to an end.

As described above, the present invention provides an arrangement in which the photometric quantity of the standard light source previously measured by a highly sensitive light receiving element and memorized, and characteristics of a second light receiving element resistant to environmental changes are memorized, and the output of the above highly sensitive light receiving element is corrected by comparing the outputs of the highly sensitive light receiving element and the second light receiving element on the basis of these memorized values, thus eliminating influences of environmental changes on measurement and ensuring that the measurement can be done at high accuracy over a long term.

The invention has thus been shown and described with reference to specific embodiments. However, it should be noted that the invention is in no way limited to the details of the illustrated structures, and that changes and modifications may be made without departing from the scope of the appended claims.

We claim:

1. A photometer comprising:

a first light receiving portion;

a second light receiving portion less sensitive to changes in temperature and other environmental influences than said first light receiving portion;

an optical portion including a reference light source and adapted for introducing light from a subject into said first light receiving portion and for introducing light from said reference light source into said first and second light receiving portions on the basis of a control signal from a controller position;

said controller position for feeding a first control signal by which said light from said subject is introduced into said first light receiving portion in accordance with a comman from an observer, and a second control signal by which said light from said reference light source is introduced into said first and second light receiving portions;

a memory portion for memorizing a photometric quantity Pr from a standard light source for setting the scale, an output Dr of said first light receiving portion generated by said light from said standard light source, an output Dpo of said first light receiving portion generated by said light from said reference light source during the scale setting time, and an output Dso of said second light receiving portion generated by said light from said reference light source during the scale setting time;

an operation portion supplied with an output Dm of said first light receiving portion generated by said light from said subject, an output Dpt of said first light receiving portion generated by said light from said reference light source during the measuring time, an output Dst of said second light receiving portion generated by said light from said reference light source during the measuring time, and said outputs Dr, Dpo and Dso read from said memory portion, said operation portion calculating a value Pm of measured quantity of light said subject of the operation:

$$Pm = Pr \times \frac{Dpo \cdot Dst}{Dpt \cdot Dso} \times \frac{Dm}{Dr}$$

2. A photometer according to claim 1, wherein said memory portion memorizes a photometric quantity Pr of said standard light source for scale setting before the scale is set and memorizes, during the scale setting time, said output Dr of said first light receiving portion generated by said light from said standard light source, said output Dpo of said first light receiving portion and said output Dso of said second light receiving portion generated by said light from said reference light source.

3. A photometer according to claim 2, wherein said memory portion is constituted by a non-volatile memory.

4. A photometer according to claim 3, wherein said memory portion identifies and memorizes each of said outputs Dr, Dpo and Dso on the basis of a signal from said control portion.

5. A photometer according to claim 1, wherein said optical portion turns on said reference light source in accordance with said second control signal from said control portion and forms a first light path through which said light from said subject is introduced into said first light receiving portion in accordance with said first control signal, and second and third light paths, said light from said reference light source being introduced through said second light path into said first light receiving portion and through said third light path into said second light receiving portion in accordance with said second control signal.

6. A photometer according to claim 5, wherein said optical portion includes a movable mirror which forms said first light path by shutting off said second and third light paths when fed with said first cohtrol signal and forms said second and third light paths by shutting said first light path when fed with said second control signal.

7. A photometer according to claim 5, wherein said optical portion includes a shutter portion in said first light path, said shutter portion forming said first light path while timed by said first control signal and forming said second light path while timed by said second control signal.

8. A photometer according to claim 1, wherein said optical portion includes a spectroscope in said first optical path.

9. A photometer according to claim 8, wherein said photometric quantity Pr of said standard light source, said output Dr of said first light receiving portion generated by said light from said standard light source, and said output Dm of said first light receiving portion generated by said light from said subject is spectral data.

10. A photometer according to claim 1, wherein said optical portion permits the quantity of light from said reference light source to be introduced into said second light receiving portion at a higher rate than the quantity of light introduced from said reference light source to said first light receiving source.

11. A photometer according to claim 10, wherein said first light receiving portion includes a phototube, said second light receiving portion includes a silicon photodiode, and said reference light source includes an LED.

12. A photometer according to claim 1, wherein said operation portion identifies each of said outputs Dm, Dpt and Dst on the basis of a signal from said control portion.

* * * * *

UNITED STATES PATENT AND TRADEMARK OFFICE
CERTIFICATE OF CORRECTION

PATENT NO. : 4,708,477

DATED : November 24, 1987

INVENTOR(S) : Yabusaki Kenji et al.

It is certified that error appears in the above-identified patent and that said Letters Patent is hereby corrected as shown below:

First page, third line of Item 56, "323,431  6/1867 Card" should read --3,323,431  6/1967 Land--.

Signed and Sealed this

Fourteenth Day of June, 1988

Attest:

DONALD J. QUIGG

*Attesting Officer*     *Commissioner of Patents and Trademarks*